Figure 1:
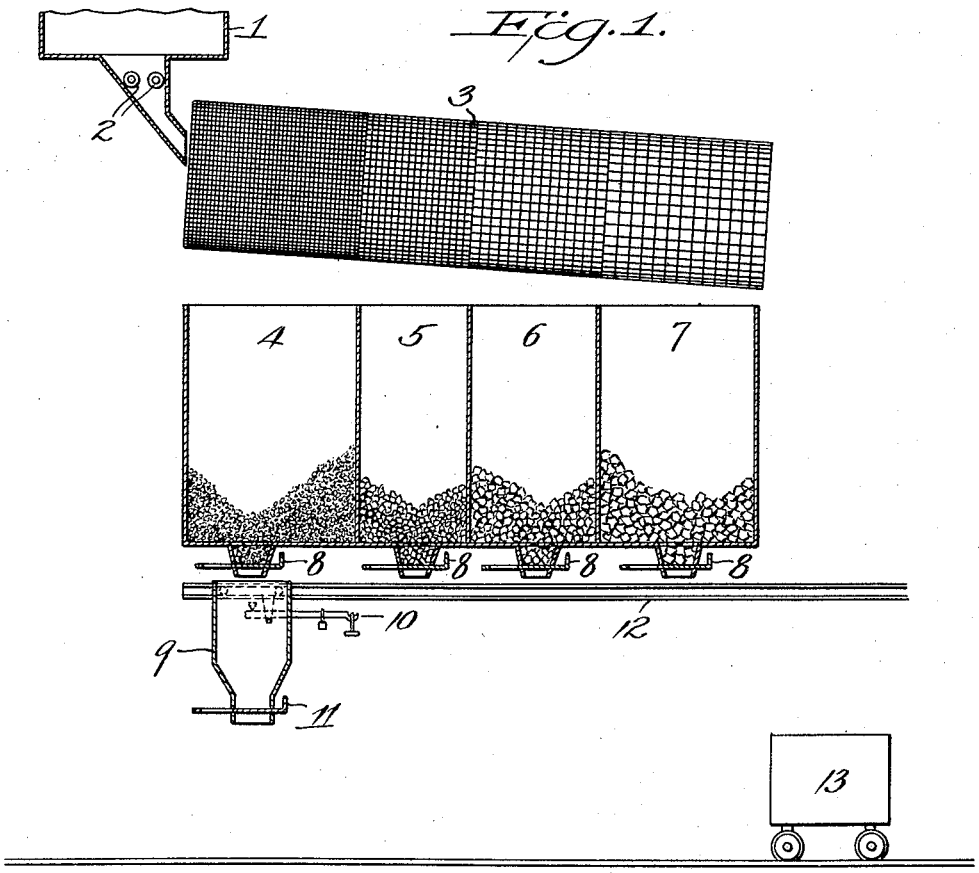

Aug. 13, 1929.   G. W. HUTCHINSON   1,724,403
PROCESS OF PREPARING CONCRETE
Original Filed Jan. 15, 1925

WITNESSES
Oliver W. Holmes

INVENTOR
George W. Hutchinson
BY
Knight Bros.
ATTORNEY

Patented Aug. 13, 1929.

1,724,403

UNITED STATES PATENT OFFICE.

GEORGE W. HUTCHINSON, OF LAKE WORTH, FLORIDA.

PROCESS OF PREPARING CONCRETE.

Application filed January 15, 1925, Serial No. 2,711. Renewed February 13, 1929.

In the production of concrete made with broken stone or coarse aggregate, sand or fine aggregate, Portland cement and water, it is common practice to have either the broken stone supplied in a regular size or to have two or more assorted sizes, or to use washed gravel containing naturally various sizes of stones, limited in maximum and minimum size only and in general just as they come from the gravel pit. It is also well known that the cementitious material must completely fill the interstices between the particles of sand as well as coat the surfaces of the sand, etc., and that this mixture of cement and sand must completely fill the interstices between the smaller particles of stone and that the mixture thus formed must completely fill the interstices formed by the larger sizes of stone and so on. There is no harm done if the filling material is more than sufficient to fill the interstices and coat the individual particle, the only objection being that in that case more of the expensive cementing material is used than is strictly required for maximum strength and economy. This fact is especially true when it is realized that the volume of cementitious material in normal concrete mixtures contributes in itself but about fifty percent of the actual strength of the concrete secured. Should, however, less of the filling material be used than is necessary to fill the interstices, the concrete will have air pockets which will result in a lessening of its strength and durability, as well as to produce greater nonuniformity. Economy requires that the amount of stone and sand shall be as great as possible for a given strength, and this can only be attained by the use of a formula rigidly adhered to, which will insure that each interstice between pieces of stone of one size will be filled or nearly filled with one piece of stone of the next smaller size and so on down to sand and even the sand may be in two or more sizes or to obtain a gradation of aggregate maintained constant, by scientific control, in which each size, from the smallest to the largest will be present in the exact volume necessary to maintain its most efficient relation to all other sizes present. By such an apportioning of the solid aggregates, the amount of the more valuable constituent, the Portland cement, may be reduced to the minimum. With the use of a mechanically driven mixer, the various aggregates will assemble themselves automatically in the ideal relation, requiring the least amount of cement and water, it being recognized that excess water decreases certain of the desirable qualities in concrete.

The ordinary means available for supplying aggregate to a concrete mixer have not heretofore been equal to the problem above set forth, chiefly because the aggregates are in general apportioned (at the points of use) by crude devices such as wheelbarrows or other volumetric devices or by weight with no control over the accurate gradation beyond the weighing of aggregate in the condition received, and by the hands of more or less unskilled labor. With such facilities, it becomes too difficult and complicated a problem to apportion a great number of solid aggregates according to a definite, rigid formula with respect to the inter-relation of size. Consequently, engineers and contractors are generally content to use the one or two sizes of stone or run-of-pit gravel, and sand, containing various degrees of moisture which results in unequal volumes, none of which are conducive to either maximum economy or maximum uniformity of strength.

The object of my present invention is to set up a combination of devices which, although each element is old and well known, their new relationship and method of operation will produce a solid aggregate that will give a concrete mixture insuring definite control of the apportionment, and having at once the maximum economy in the use of cement, maximum uniformity of strength of concrete, while at the same time preventing absolutely any interference in the way of ignorance on the part of labor or carelessness on the part of engineers or contractors to prevent the rigid adherence to the prescribed formula. To this end my invention comprises a combination of apparatus and method of operating the same in which a rock screen machine of several separate sizes which may also include a sand screen for one or more sizes, which screen delivers directly or indirectly to a series of bins or hoppers, the screen for the first bin having openings for permitting the passage of the smallest size of aggregate, the next bin receiving the next largest size, and so on until the last bin receives the largest size of all, any sizes in excess of this being rejected at the end of the screen. A rock crusher may be supplied at the head of the screen to insure that all rock going into the screen is reduced at least to the largest size prescribed. Such a screen will, therefore, sort out the various sizes as they are supplied, but the proportional amounts of the various sizes thus sorted out will not correspond to the ideal proportions required by a proper mixture for concrete. It, therefore, becomes necessary to provide additional apparatus for measuring off from each of the bins the amount required of each size by the prescribed formula. For maximum economy or given strength, the formula will be varied at times to meet the requirements of the various types of aggregates and quality of cements which are most economically obtained. What is desired is that a certain volume of each size determined by a carefully calculated formula shall be taken out of each bin to form a truckload or a charge for a concrete mixer. The most accurate and simplest way of doing this is to apportion the amounts by weight, the volume of each size being, of course, proportional to its weight, although the volume of one size will not be the same as the volume of another size for a given weight. I, therefore, employ in combination with the bins aforesaid, a measuring or weighing apparatus which may be arranged beneath the bins, the same being, for example, in the form of a traveling, weighing hopper that may be moved from under one bin to another, stopping at each bin to receive the required amount of material from such bin measured by the balance beam of the weighing hopper or by a stationary weighing device receiving material from all bins weighed separately, and discharged, when weighed, onto a truck or concrete mixer, traveling belt or other receptacle. As the proportions required by the formula will, as above stated, always be different from that furnished by the screen, some of the bins will become overfull or depleted. Such surplus accumulations may be removed by overflow from such overfull bins and such depletions may be corrected by supply from proper graded sources and it will, therefore, be seen that in this arrangement of screen, bins, and measuring device, etc., there is a give and take allowance furnished by the bins whereby in one apparatus the incorrect mixture of aggregate is translated into a correct mixture. Higher strength may be thus secured with less of the costly ingredients and the finished product is of greater density, uniformity, watertightness, and durability, all of which are of great economic importance.

This invention does not require that the minimum or maximum size limits of the aggregates as received be of definite size or relation to each other. Its function is to control by the use of relatively narrow limits of gradation, and reassortment of the material received, the apportionment of each of the sizes, made by these relatively narrow limits, with respect to amount in relation to the several other sizes used.

The accompanying drawings represent in Figure 1 a side elevation in partial section of one means of carrying out my invention.

Figure 2:
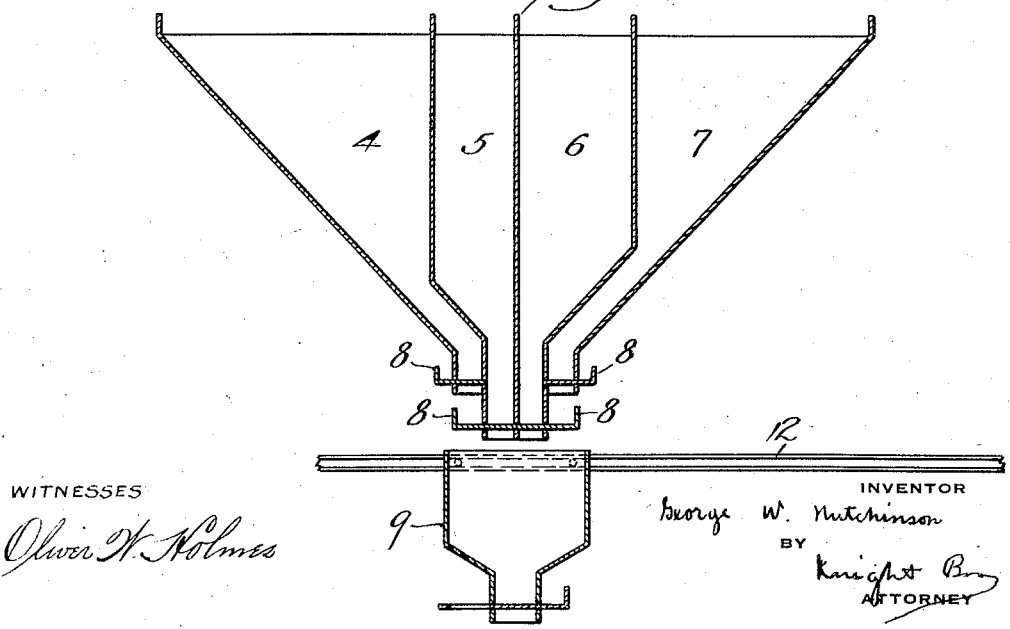

Figure 2 represents a sectional view of another example.

1 represents a receptacle for broken stone as it comes from the pit or quarry. 2 represents a roller crusher for reducing the broken stone to sizes below a desired maximum. 3 is a graded screen which is shown as of the rotative cylindrical type although it may equally well be of the inclined grid type. 4, 5, 6 and 7 are bins adapted to receive the different sizes of material supplied by screen 3. The bins are shown directly under the screen as this will in general be a preferred method, but it is evident that they may not be so related since conveying mechanism may be used to take the materials as they drop from the screens to any elevation or distance, depositing the various sizes in their proper bins at any suitable location. In the apparatus shown in Figure 1, each bin has a chute and a gate 8 at its lower end for discharge of its contents. To receive such discharges there is illustrated a weighing hopper 9 provided with a suitable scale 10, a discharge gate 11 and a carrier track 12. By this means any desired proportion of each aggregate to the whole may be drawn from a bin into the weighing hopper, the gate 8 being closed when the proper weight of that particular aggregate has been added. When the proper amounts of all the aggregates have thus been accumulated in the weighing hopper 9, the same may be moved along its carrier track 12 and its contents discharged into a receptacle 13 by opening the gate 11 in the bottom of the hopper. The receptacle 13 while shown as a truck, may in fact be the hopper of a concrete mixer, a bucket or belt conveyer to railroad cars or any other means of disposing of the properly apportioned aggregate that may suit the particular conditions. The charge of the weighing hopper 9 will, however, in general be the proper amount for one batch for the concrete mixer, the accurate measurement of which is of considerable importance. As the screen deposits assorted aggregates in the appropriate bins and the weighing hopper abstracts them according to an arbitrary formula which would naturally have no special relation to the proportions of these aggregates deposited by the screen, some of the sizes will accumulate faster in the bins than others. Such surplus accumulations will form an overflow which may occur by the bins filling up overfull and the surplus falling off on the side or into a chute or conveyer to be disposed of in any way desired. If the screen is run slower the accumulating discrepancy between the natural ungraded aggregates and the graded aggregates required by the formula will result in the depletion of some of the bins which depletion can be corrected by the additions from graded stock piles of those sizes that the natural mixture is deficient in.

In Figure 2 is shown a series of bins 4, 5, 6 and 7, which may be placed immediately under the screens shown in Figure 1. The bins shown in Figure 2 have chutes all leading to one discharge point and are provided with gates 8 at the lower ends of the chutes. The hopper 9 is charged with a suitably apportioned batch of aggregates by opening the gates 8 in succession and weighing in the proper amount of each size. The hopper may be made to travel on a track 12 as in the example shown in Figure 1 or the contents after weighing may be discharged directly onto a conveyer which will carry the batch to a concrete mixer, a truck or other suitable destination. It will be seen that in both cases I have interposed between the screening device which separates out the various sizes of aggregates according to their natural formation and a batch receptacle, an apportioning apparatus which serves to reapportion the aggregates from the natural proportions to an artificial proportion more suitable for the production of a concrete of maximum economy and strength. It will further be evident that the bins furnish a give and take means of adjusting or correcting the discrepancy continually accumulating between the natural supply and the artificial requirements. I have used the term "natural aggregates" to designate such heterogeneous mixtures as would be found in nature such as a gravel bed or the mixture that would be produced by a stone crusher.

I claim:—

1. Means for combining classified concrete aggregates in any proportions according to a prescribed formula, comprising bins containing the different sizes, a single receptacle adapted to receive material from the bins, and means for measuring the material from each bin before its deposit in said receptacle.

2. Means for combining classified concrete aggregates in any proportions according to a prescribed formula, comprising bins containing the different sizes, a single receptacle adapted to receive material from the bins, and means carried by the receptacle for measuring the material from each bin before its deposit in the receptacle.

3. Means for combining classified concrete aggregates in any proportions according to a prescribed formula, comprising bins containing the different sizes, a single receptacle adapted to receive material from the bins, and means for weighing the material from each bin before its deposit in said receptacle.

4. Means for combining classified concrete aggregates in any proportions according to a prescribed formula, comprising bins containing the different sizes, a single receptacle adapted to receive material from the bins, and means carried by the receptacle for weighing the material from each bin before its deposit in the receptacle.

5. Means for combining classified concrete aggregates in variable proportions according to a prescribed formula, comprising bins containing the different sizes, a single receptacle adapted to move under said bins to receive material from each of them, and means carried by said receptacle for accurately measuring the material from each bin in accordance with the prescribed formula before its deposit in the receptacle.

GEORGE W. HUTCHINSON.